US010704887B1

(12) United States Patent
Beardsworth (10) Patent No.: US 10,704,887 B1
(45) Date of Patent: Jul. 7, 2020

(54) MULTI-BEAM LASER COORDINATE MEASURING SYSTEM

(71) Applicant: X Development LLC, Mountain View, CA (US)

(72) Inventor: Michael Beardsworth, San Francisco, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 16/287,613

(22) Filed: Feb. 27, 2019

(51) Int. Cl.
*G01B 9/02* (2006.01)
*G01S 17/66* (2006.01)

(52) U.S. Cl.
CPC ..... *G01B 9/02007* (2013.01); *G01B 9/02021* (2013.01); *G01B 9/02025* (2013.01); *G01S 17/66* (2013.01)

(58) Field of Classification Search
CPC ........ G01S 17/66; G01S 17/023; G01S 17/89; G01S 17/42; G01S 3/786; G01S 7/4808; G01S 17/10; G01S 17/48; G01S 7/4818; G01S 17/36; G01S 7/4813; G01S 17/06; G01S 17/87; G01S 7/4817; G01S 7/497; G01S 17/08; G01S 7/4865; G01S 7/51; G01S 7/481; G01S 17/325; G01S 17/88; G01S 5/163; G01S 7/4812; G01S 7/4816; G01S 7/491; G01S 17/32; G01S 7/4814; G01S 17/003; G01S 17/46; G01S 3/783; G01S 7/4802; G01S 7/4861; G01S 7/4863; G01S 7/487; G01S 7/4972; G01S 7/003; G01S 7/4804; G01S 7/4811; G01S 7/4815; G01S 7/4868; G01S 7/4912; G01S 7/4917; G01S 7/499; G01B 11/002; G01B 11/005; G01B 11/25; G01B 5/004; G01B 11/14; G01B 11/24; G01B 11/2518; G01B 5/008; G01B 11/2513; G01B 11/2545; G01B 21/042; G01B 11/03; G01B 11/245; G01B 21/047; G01B 11/026; G01B 11/2531; G01B 21/04; G01B 21/045; G01B 21/16;
(Continued)

(56) References Cited

U.S. PATENT DOCUMENTS

| | | | | |
|---|---|---|---|---|
| 5,903,459 A | * | 5/1999 | Greenwood | ......... G05B 19/401 700/108 |
| 5,949,685 A | * | 9/1999 | Greenwood | ......... G05B 19/404 356/634 |
| 5,973,788 A | | 10/1999 | Pettersen et al. | |

(Continued)

*Primary Examiner* — Michael P Stafira
(74) *Attorney, Agent, or Firm* — Fish & Richardson P.C.

(57) ABSTRACT

A laser tracking system for determining pose information of a rigid object is disclosed. The laser tracking system includes three or more retroreflectors, three or more sets of multiple laser trackers, and an electronic controller. Each retroreflector is secured to the rigid object that is moveable within a frame of reference. For each set of laser trackers, each laser tracker is configured to direct a laser beam to and receive a reflected laser beam from an associated one of the retroreflectors within the frame of reference. The electronic controller is in communication with each of the laser trackers and determines the pose information of the rigid object in the reference frame based on information about the fixed location of each laser tracker in the frame of reference and information about a distance of each retroreflector from each laser tracker of the set of laser trackers associated with the retroreflector.

18 Claims, 4 Drawing Sheets

(58) Field of Classification Search
CPC .......................... G01B 11/02; G01B 2210/52; G01B 2210/58; G01B 9/02007; G01B 9/02012; G01B 11/00; G01B 11/007; G01B 11/2509; G01B 11/285; G01B 2290/70; G01B 5/0014; G01B 5/012; G01B 7/008; G01B 7/012; G01B 9/02; G01B 9/02002; G01B 9/02038; G01B 9/02068; G01B 9/02075; G01J 3/513; G01N 21/6445; G01N 29/043; G01N 29/225; G01N 29/265

See application file for complete search history.

(56) References Cited

U.S. PATENT DOCUMENTS

| | | | |
|---|---|---|---|
| 6,392,222 B1 * | 5/2002 | Greenwood | G05B 19/404 |
| | | | 250/221 |
| 6,615,102 B1 * | 9/2003 | Morfino | G05B 19/404 |
| | | | 700/166 |
| 6,681,145 B1 * | 1/2004 | Greenwood | B25J 9/1692 |
| | | | 700/176 |
| 7,800,758 B1 * | 9/2010 | Bridges | G01B 11/002 |
| | | | 356/482 |
| 8,630,314 B2 | 6/2014 | York | |
| 9,482,524 B2 | 9/2016 | Metzler et al. | |
| 2008/0216552 A1 * | 9/2008 | Ibach | B25J 9/1692 |
| | | | 73/1.01 |
| 2009/0240372 A1 * | 9/2009 | Bordyn | B25J 9/1692 |
| | | | 700/259 |
| 2011/0170534 A1 * | 7/2011 | York | H04J 3/0667 |
| | | | 370/350 |

* cited by examiner

MULTI-BEAM LASER COORDINATE MEASURING SYSTEM

BACKGROUND

Laser trackers are instruments that are used to determine a location, orientation, and/or dimensions of an object. Laser trackers can measure distances on orders of tens of meters with hundredths of microns accuracy. Laser trackers are commonly used in manufacturing environments and other industrial environments, where accuracy in determining and tracking location of objects is an issue. Example industries include, but are not limited to, aerospace, aircraft assembly, auto-body plants, construction, etc.

Laser trackers work by directing a laser beam to an optical target, often a retroreflector, attached to the object being tracked, and detecting the beam reflected back to the source. In some cases, laser trackers determine the distance from the optical target to the laser tracker based on time of flight measurements. Laser trackers typically include actuators or drives which rotate the laser source and detector to track the object as it moves. The laser tracker commonly includes one or more encoders that monitor the direction of the laser beam as the laser source moves. For example, laser trackers can include encoders to monitor rotations of the laser source in a tilt plane and a pan plane. Laser tracker systems can use information about the encoders' rotational angles and the distance measurements to determine the location of the object with respect to the laser tracker.

SUMMARY

Implementations of the present disclosure include methods and apparatuses for determining a precise pose of an object. More particularly, implementations of the present disclosure are directed to multi-beam laser tracker systems that determine orientation and location of an object.

Some embodiments include a laser tracking system for determining pose information of a rigid object. The laser tracking system includes three or more retroreflectors, three or more sets of multiple laser trackers, and an electronic controller. Each retroreflector is secured to the rigid object that is moveable within a frame of reference. Each laser tracker is arranged at a different fixed location in the frame of reference. For each set of laser trackers, each laser tracker is configured to direct a laser beam to and receive a reflected laser beam from an associated one of the retroreflectors within the frame of reference. Each laser tracker is actuable about a corresponding pan axis and a corresponding tilt axis. The electronic controller is in communication with each of the laser trackers. The electronic controller is programmed to determine the pose information of the rigid object in the reference frame based on information about the fixed location of each laser tracker in the frame of reference and information about a distance of each retroreflector from each laser tracker of the set of laser trackers associated with the retroreflector. The distance is determined from the respective received reflected laser beam for each laser tracker.

These and other implementations may each optionally include one or more of the following features.

The electronic controller can determine the pose information of the rigid object based on positional relationship between the three or more retroreflectors. The electronic controller can determines the pose information of the rigid object by determining a location of each of the retroreflectors, wherein the electronic controller determines a first location of a first retroreflector by triangulating distances measured by at least three laser trackers of a first set of laser trackers associated with the first retroreflector. The electronic controller can be configured to determine the pose information of the rigid object by determining an orientation of the object based on locations of the three or more retroreflectors, wherein a location of each retroreflector is determined by triangulating distances measured by laser trackers of a respective set of laser tracker associated with the retroreflector.

In some implementations, each set of laser trackers has three or more laser trackers.

In some embodiments, the electronic controller is configured to communicate the pose information of the rigid object to a robot for use in controlling the robot in performing a task relative to the rigid object.

The electronic controller can determine the pose of the rigid object at least in part based on relative locations of the three or more retroreflectors with respect to the rigid object.

The pose information may include orientation information and location information of the rigid object.

In some embodiments, at least one of the three or more retroreflectors is placed on an intermediary object that is fixed in location relative to the rigid object. In some embodiments, at least one of the three or more retroreflectors is in direct contact with the rigid object.

Other implementations include corresponding method of determining pose information of a rigid object. The method can include: directing, by three or more sets of multiple laser trackers, a plurality of laser beams to three or more retroreflectors secured to the rigid object that is movable within a frame of reference, each set of multiple laser trackers being associated with a respective retroreflector to monitor a location of the respective retroreflector; in response to directing the plurality of laser beams, receiving, by the three or more sets of multiple laser trackers and from the retroreflectors, a plurality of reflected laser beams; determining a distance between each laser tracker and a corresponding one of the retroreflectors based on the received reflected laser beams; obtaining, by an electronic controller that is in communication with the laser trackers, information regarding a respective location of each of the laser trackers in the frame of reference; and determining, by the electronic controller, the pose information of the rigid object in the frame of reference, wherein the pose information is determined based on the information regarding the respective location of each laser tracker and information about the location of each retroreflector from each laser tracker of the set of laser trackers associated with the retroreflector.

These and other implementations may each optionally include one or more of the following features: the electronic controller determines the pose information of the rigid object based on positional relationship between the three or more retroreflectors; the pose information of the rigid object is determined based on a location of each of the retroreflectors, wherein a first location of a first retroreflector is determined by triangulating distances measured by at least three laser trackers of a first set of laser trackers associated with the first retroreflector; the pose information of the rigid object is determined based on an orientation of the object based on locations of the three or more retroreflectors, a location of each retroreflector is determined by triangulating distances measured by laser trackers of a respective set of laser tracker associated with the retroreflector; each set of laser trackers has three or more laser trackers; the actions further include communicating the pose information of the rigid object to a robot for use in controlling the robot in performing a task relative to the rigid object; the pose of the rigid object is determined at least in part based on relative locations of the three or more retroreflectors with respect to the rigid object; the pose information includes orientation information and location information of the rigid object.

Among other advantages, implementations can provide techniques to improve accuracy in measuring a location of an object. One limiting factor in measurement accuracy of laser trackers is the encoders' resolution. The implementations of the present disclosure provide techniques to improve measurement accuracy by reducing dependency of the accuracy on encoders' measurements. For example, systems using a plurality of laser trackers arranged in fixed locations can triangulate the distance measurements from the laser trackers to determine an exact location of an object without using encoder measurements.

Laser track systems can also provide techniques to measure orientation of an object by using multiple laser trackers and multiple retroreflectors. The laser tracker system can determine the orientation of an object by tracking three or more retroreflectors secured to the object. This technique can provide a more accurate measurement of the orientation of the object as compared to conventional methods that use cameras for orientation determination. In addition, using the triangulation method for determining the locations of the retroreflectors can improve the measurement accuracy even further. Accordingly, the present implementations improve accuracy in determining a pose (which is a combination of a location and an orientation) of an object by using laser trackers.

Determining a location, an orientation, and/or a pose of an object accurately can be significantly beneficial in a variety of technologies such as robotics, process control, automatic inspections, scene or object recognition, virtual reality (VR), augmented reality (AR), and annotations and visualization. For example, laser trackers are used in aerospace manufacturing where large pieces of equipment need to be assembled with high level of accuracy. Providing an accurate pose of an object to a controller of a robot can help in navigating the robot relative to the object, guiding the robot to perform a safe gripping or grasping of the objects, directing the robot as to how far and to what direction to move the grasped or gripped object to deliver or assemble the object to a correct location or part, protecting the robot from getting in contact with harmful objects (e.g., objects that have high temperature, or high magnetic field), etc. For example, a higher accuracy in measuring the pose of a robot tool (e.g., a tool tip, an arm) allows the robot to move the robot tool more accurately (e.g., to a more accurate location).

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

The present disclosure provides systems and methods to determine a pose of a rigid object by using multiple laser trackers. The disclosed systems and methods can provide a more accurate and more precise measurement of a location, an orientation, and/or a pose of an object than conventional cameras do. In addition, the disclosed systems and methods can reduce dependency of laser tracker measurements on encoders and improve accuracy in measuring location and orientation of objects.

Figure 1:
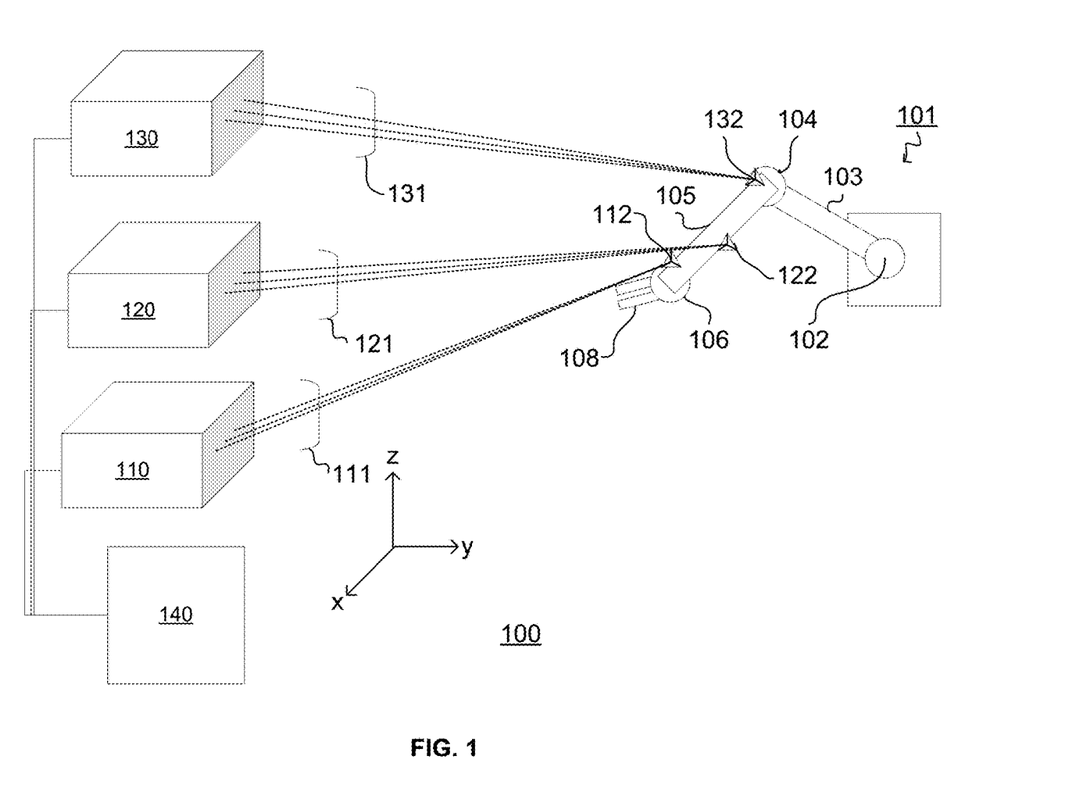
FIG. 1 illustrates an example application of the implementations of the present disclosure for determining a pose of a rigid object by a laser tracker system.

Referring to FIG. 1, a laser tracking system 100 is arranged to track the pose (i.e., location and orientation) of a robotic arm of a robot 101 by monitoring the location of three retroreflectors 112, 122, and 132 each attached to a segment 105 of the robot arm in 3D space.

As illustrated, robot 101 includes a base unit and two arm segments 103 and 105 that connect, via rotary joints 102, 104, and 106, to a robotic gripper 108. During operation, robot 101 moves gripper 108 to perform various tasks by rotating the base around a rotation axis parallel to the z-axis, and extending or retracting the arm by actuating rotary joints 102, 104, and 106.

System 100 includes three sub-systems 110, 120, and 130, each in communication with a common electronic control module 140. Each sub-system includes three laser trackers arranged to track the distance to one of the retroreflectors by directing laser beams (111, 121, and 131) to the corresponding retroreflector and detecting laser light reflected in response.

Figure 2:
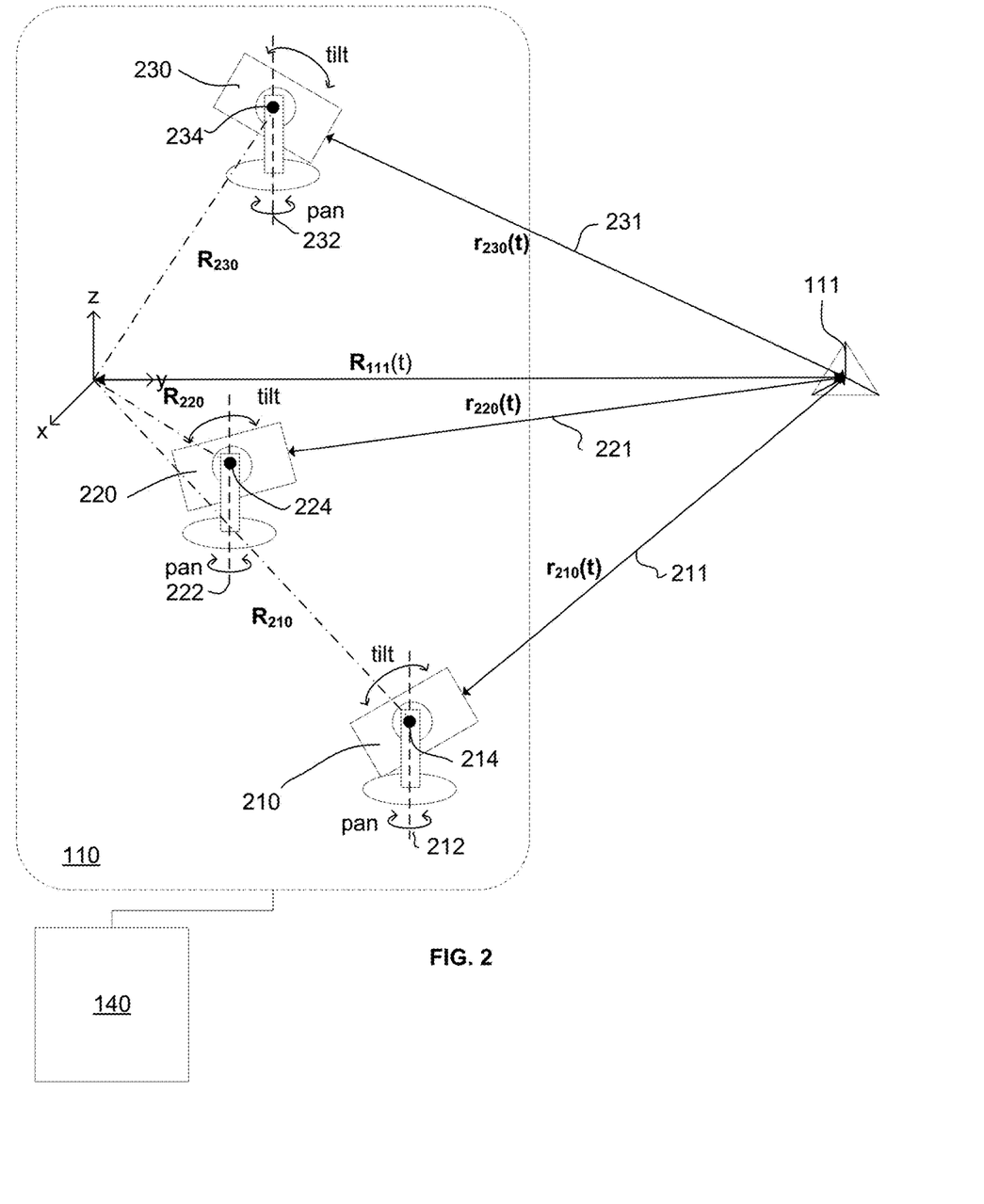
FIG. 2 illustrates an example laser tracker-reflector sub-system of the system illustrated in FIG. 1.

Sub-system 110 is illustrated in FIG. 2 and includes three laser trackers 210, 220, and 230, each arranged at different locations in a frame of reference of the system (as illustrated by the Cartesian coordinate system in FIG. 2). The location of each laser tracker in the reference frame is indicated by a vector ($R_{210}$, $R_{220}$, and $R_{230}$), which are established to high accuracy (e.g., accurate to within 1 mm or less) when the system is set up and/or during a system calibration.

Each of the laser trackers includes a laser light source (e.g., providing visible or invisible laser light, such as IR light) and a laser light detector. The laser trackers are arranged to measure a distance to retroreflector 111 (corresponding to the magnitude of vectors $r_{210}(t)$, $r_{220}(t)$, and $r_{230}(t)$, respectively) by directing a laser beam from the laser light source towards the retroreflector and detecting reflected laser light using the detector. In general, laser trackers 210, 220, and 230 can be commercially-available laser trackers, such as laser trackers available from Faro (Lake Mary, Fla.) or Leica Geosystems AG (Unterfelden, Switzerland).

Each laser tracker includes actuators that rotate the tracker about a pan axis varying the azimuthal orientation of the tracker. Specifically, laser tracker 210 rotates about pan axis 212, laser tracker 220 rotates about pan axis 222, and laser tracker 230 rotates about pan axis 232. Each tracker also includes actuators for rotating the tracker about a tilt axis, changing the polar angle of orientation of the tracker. Specifically, laser tracker 210 rotates about tilt axis 214. The location where the pan axis and tilt axis intersect corresponds to the center of rotation of each laser tracker and the placement vectors in the frame of reference for the system can be determined from the reference frame's origin to this point for each laser tracker.

The laser trackers use the pan and tilt actuators to follow retroreflector 111 as it moves within the reference frame, providing system 100 with near continuous distance measurements from tracker to the retroreflector. The distance measurements can have submillimeter accuracy over distances of tens of meters, for example, and can be updated at frequencies of 100 Hz or more.

Using principles of triangulation, electronic controller 140 is programmed to determine location information about retroreflector 111 ($R_{111}(t)$) in the reference frame based on the measurements of distances $|r_{210}(t)|$, $|r_{220}(t)|$, and $|r_{230}(t)|$, respectively, along with placement vectors $R_{210}$, $R_{220}$, and $R_{230}$. Mathematically, the location $R_{111}(t)$ of retroreflector 111 represents three unknown variables ($x_{111}(t)$, $y_{111}(t)$, $z_{111}(t)$). Each distance measurement, which is known from the laser tracker measurements, can be mathematically represented by the equations:

$$R_{111}(t) = r_{110}(t) + R_{110}$$

$$R_{111}(t) = r_{120}(t) + R_{120}$$

$$R_{111}(t) = r_{130}(t) + R_{130}$$

Effectively, the three coordinates of retroreflector 111 are three unknowns, and the relationship between the position of each laser tracker and the retroreflector yield three separate equations for solving for the three unknowns, providing a mathematically tractable problem. In calculating the location, measurement errors can also be taken into account. For example, the laser tracker sensors that measure distances $r_{1x0}(t)$ may have Gaussian errors. To improve accuracy, error distribution of these sensors can be intersected to find a probable region where the retroreflector is most likely located. In other words, the triangulation principle can be applied to measurement ranges that include error distributions of the sensors rather than to absolute values measured by the sensors.

While each laser tracker 210, 220, and 230 can include encoders to provide the system with information about the pan and tilt angle of the laser tracker, the system can determine pose information of retroreflector 111 based entirely on the distance measurements. An advantage of this is that the distance measurements can provide a higher level of accuracy than the encoder measurements. Accordingly, pose information determined entirely using the distance measurements can be more accurate than those determined based on encoder measurements.

Referring back to FIG. 1, sub-systems 120 and 130 are constituted similarly to sub-system 110 and provide corresponding information about the location of retroreflectors 121 and 131 respectively, with respect to the same reference frame. Thus, where the positional relationship between the three retroreflectors on robot arm 105 are known in advance (e.g., from setup and/or system calibration), it is possible to determine pose information (position and orientation) of the robot arm.

System 100 can use the pose information to automate control of robot 101. For example, as part of a feedback process, system 100 can provide the pose information to robot 101, which then uses the information to further adjust the robot's arm to perform a task.

While system 100 features three laser tracker sub-systems, more generally, other arrangements are possible. For example, in some embodiments, more than three sub-systems can be used to monitor a single robot arm segment. Alternatively, or additionally, each sub-system can include more than three laser trackers. For example, where the rigid body being monitored is in an environment and/or used for an application where the line of sight from one or more of the trackers to the corresponding retroreflector may be occluded, additional laser trackers—positioned at different places within the operational environment—can be included in a sub-system to provide a level of redundancy sufficient to compensate for circumstances where one of the trackers is unable to perform its function.

Moreover, while system 100 shows a system for tracking only a single segment of the robotic arm, similar systems can be used to monitor other moveable components of the robot, e.g., arm segment 103 and/or robotic gripper 108. Also, although system 100 is shown having three sub-systems for monitoring the location of three retroreflectors attached to a rigid body, systems with more than three retroreflectors may be designed for pose determination. A higher number of reflectors can improve orientation and location measurement accuracy.

In general, while the illustrated system 100 includes nine laser trackers, systems using fewer or more laser trackers are also possible. Generally, determining a pose of an object involves determining six pose variables: three variables for location (i.e., three translational degree of freedom), and three variables for orientation (i.e., three rotational degree of freedom) of the object. Generally, a sufficient number of laser trackers should be included to provide information sufficient to calculate the six variables.

Depending on the accuracy that is desired, more or fewer than nine laser trackers may be used. For example, if a relatively lower level of accuracy is needed for certain degrees of freedom, fewer laser trackers can be used to monitor one or more of the retroreflectors and information from encoders in the laser tracker can be used to provide information for determining the location of that retroreflector.

In some embodiments, more than three laser trackers can be used to track a single retroreflector. Such arrangements can provide a level of redundancy to ensure operational viability of the system in the event one of the laser trackers malfunctions or has its line of sight to the retroreflector occluded.

Although each laser tracker in each sub-system is calibrated with respect to all other laser trackers in the sub-system (e.g., $R_{110}$, $R_{120}$, and $R_{130}$ are determined to high accuracy), laser trackers need not be calibrated with respect to laser trackers in other sub-systems. Accordingly, in some embodiments, each sub-system is mounted in an assembly moveable with respect to the assemblies of the other sub-systems.

In general, while the system described above is used to monitor pose of a segment of a robot arm, more generally the laser tracking systems disclosed herein can be used in a variety of applications. For example, the laser tracking systems can be used in industrial applications such as product assembly (e.g., assembly of aerospace or automotive systems) and alignment of large machine tools. In such applications, the systems can be used to monitor assembly robots, for example, or the parts that are being assembled themselves. For instance, in aircraft assembly, laser tracking systems can be used to track the pose of a wing while it is being attached to the aircraft fuselage. In such instances, the retroreflectors can be attached to the aircraft wing in order to close monitor the position and pose of the wing while it is being aligned with the aircraft fuselage.

Figure 3:
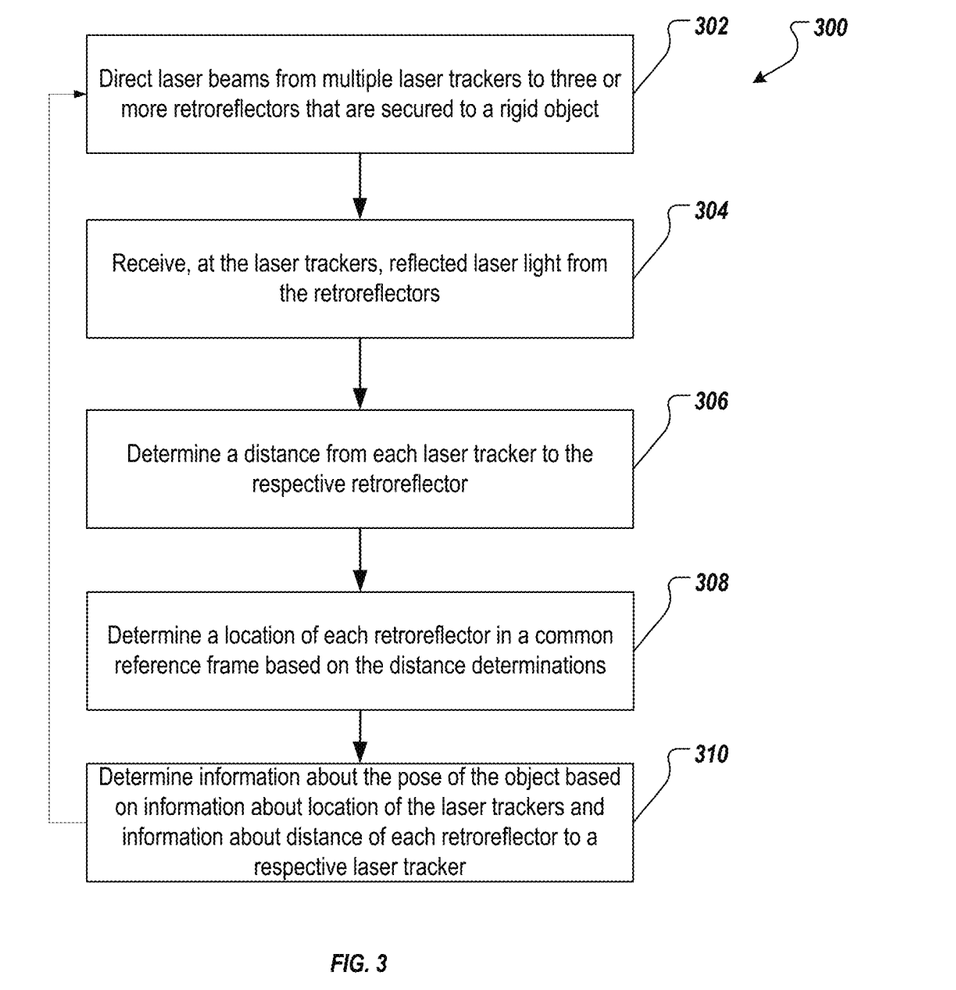
FIG. 3 depicts an example process that can be executed in accordance with the implementations of the present disclosure.

Referring to FIG. 3, an exemplary process 300 for determining pose information about a rigid object in a reference frame using laser tracking systems such as system 100 is shown in a flowchart. The process 300 may be performed using one or more computer-executable programs executed using one or more computing devices and one or more laser tracker systems.

Process 300 involves directing laser beams from multiple laser trackers to three or more retroreflectors that are secured to a rigid target object (302). The laser trackers are arranged in groups of three or more, and the laser trackers in each group are arranged to track a common retroreflector. The retroreflectors can be directly or indirectly secured to the target object. A retroreflector is secured directly on the target object when the retroreflector is in direct contact with the target object (e.g., a retroreflector that is placed directly on the arm 105 in FIG. 1). A retroreflector is secured indirectly on a target object when an intermediary component that is fixed in location relative to the target object, holds the retroreflector.

The laser trackers receive reflected laser light from the retroreflector to which its beam is directed (304).

Each laser tracker determines a distance to the corresponding retroreflector based on the detected laser light. (306). This information may be stored on a data storage, or may be input into or updated on the data storage by an operator. The information may be obtained by a controller of each set of laser trackers, or by a controller that is in communication with multiple sets of laser trackers, e.g., an electronic controller.

Based on the distance information from each laser tracker in a group, and where the relative arrangement of each laser tracker in the reference frame is known, a location of each retroreflector in the reference frame is determined (308).

The pose of the target object is then determined based on information about the location of each retroreflector (310). The pose includes a location and an orientation of the target object.

Figure 4:
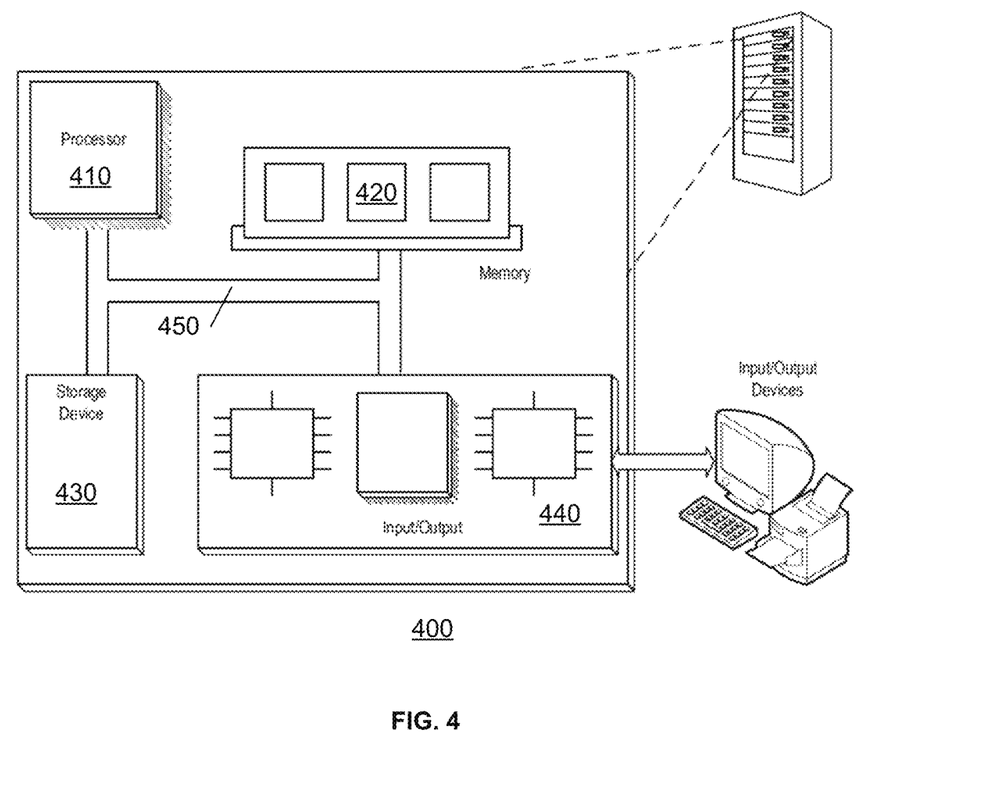
FIG. 4 is a schematic diagram of an example computer system according to implementations of the present disclosure.

In general, the electronic control module that is included in laser tracking system 100 can include a general purpose computer and/or control electronics specifically designed for use in the laser tracking system. FIG. 4 is a schematic diagram of an example computer system 400 that may be used. The system 400 can be used to carry out the operations described in association the implementations described previously. In some implementations, computer systems and devices and the functional operations described above can be implemented in digital electronic circuitry, in tangibly-embodied computer software or firmware, in computer hardware, including the structures disclosed in this specification (e.g., system 400) and their structural equivalents, or in combinations of one or more of them. The system 400 is intended to include various forms of digital computers, such as laptops, desktops, workstations, personal digital assistants, servers, blade servers, mainframes, and other appropriate computers, including vehicles installed on base units or pod units of modular vehicles. The system 400 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400.

The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Other embodiments are in the following claims.

What is claimed is:

1. A laser tracking system for determining pose information of a rigid object, the laser tracking system comprising:
three or more retroreflectors each secured to the rigid object that is moveable within a frame of reference;
three or more sets of multiple laser trackers, each laser tracker arranged at a different fixed location in the frame of reference, wherein for each set of laser trackers, each laser tracker is configured to direct a laser beam to and receive a reflected laser beam from an associated one of the retroreflectors within the frame of reference so that the associated retroreflector receives multiple laser beams from multiple laser trackers in the set, each laser tracker being actuable about a corresponding pan axis and a corresponding tilt axis; and
an electronic controller in communication with each of the laser trackers, the electronic controller being programmed to determine the pose information of the rigid object in the reference frame based on information about the fixed location of each laser tracker in the frame of reference and information about a distance of each retroreflector from each laser tracker of the set of laser trackers associated with the retroreflector, the distance being determined from the respective received reflected laser beam for each laser tracker.

2. The system of claim 1, wherein the electronic controller determines the pose information of the rigid object based on positional relationship between the three or more retroreflectors.

3. The system of claim 1, wherein the electronic controller determines the pose information of the rigid object by determining a location of each of the retroreflectors, wherein the electronic controller determines a first location of a first retroreflector by triangulating distances measured by at least three laser trackers of a first set of laser trackers associated with the first retroreflector.

4. The system of claim 1, wherein the electronic controller is configured to determine the pose information of the rigid object by determining an orientation of the object based on locations of the three or more retroreflectors,
wherein a location of each retroreflector is determined by triangulating distances measured by laser trackers of a respective set of laser tracker associated with the retroreflector.

5. The system of claim 1, wherein each set of laser trackers has three or more laser trackers.

6. The system of claim 1, wherein the electronic controller is configured to communicate the pose information of the rigid object to a robot for use in controlling the robot in performing a task relative to the rigid object.

7. The system of claim 1, wherein the electronic controller determines the pose of the rigid object at least in part based on relative locations of the three or more retroreflectors with respect to the rigid object.

8. The system of claim 1, wherein the pose information includes orientation information and location information of the rigid object.

9. The system of claim 1, wherein at least one of the three or more retroreflectors is placed on an intermediary object that is fixed in location relative to the rigid object.

10. The system of claim 1, wherein at least one of the three or more retroreflectors is in direct contact with the rigid object.

11. A method of determining pose information of a rigid object, the method comprising:
directing, by three or more sets of multiple laser trackers, a plurality of laser beams to three or more retroreflectors secured to the rigid object that is movable within a frame of reference, wherein multiple laser trackers in each set of multiple laser trackers direct laser beams to a respective retroreflector associated with the set to monitor a location of the respective retroreflector;
in response to directing the plurality of laser beams, receiving, by the three or more sets of multiple laser trackers and from the retroreflectors, a plurality of reflected laser beams;
determining a distance between each laser tracker and a corresponding one of the retroreflectors based on the received reflected laser beams;
obtaining, by an electronic controller that is in communication with the laser trackers, information regarding a respective location of each of the laser trackers in the frame of reference; and
determining, by the electronic controller, the pose information of the rigid object in the frame of reference, wherein the pose information is determined based on the information regarding the respective location of each laser tracker and information about the location of each retroreflector from each laser tracker of the set of laser trackers associated with the retroreflector.

12. The method of claim 11, wherein the electronic controller determines the pose information of the rigid object based on positional relationship between the three or more retroreflectors.

13. The method of claim 11, wherein the pose information of the rigid object is determined based on a location of each of the retroreflectors, wherein a first location of a first retroreflector is determined by triangulating distances measured by at least three laser trackers of a first set of laser trackers associated with the first retroreflector.

14. The method of claim 11, the pose information of the rigid object is determined based on an orientation of the object based on locations of the three or more retroreflectors, wherein a location of each retroreflector is determined by triangulating distances measured by laser trackers of a respective set of laser tracker associated with the retroreflector.

15. The method of claim 11, wherein each set of laser trackers has three or more laser trackers.

16. The method of claim 11, further comprising communicating the pose information of the rigid object to a robot for use in controlling the robot in performing a task relative to the rigid object.

17. The method of claim 11, wherein the pose of the rigid object is determined at least in part based on relative locations of the three or more retroreflectors with respect to the rigid object.

18. The method of claim 11, wherein the pose information includes orientation information and location information of the rigid object.

* * * * *